(12) United States Patent
Strauss et al.

(10) Patent No.: US 9,108,849 B2
(45) Date of Patent: Aug. 18, 2015

(54) DEVICE FOR FORMING VERTICALLY ALIGNED CARBON NANOTUBE ARRAYS

(71) Applicant: Teledyne Scientific Imaging, LLC, Thousand Oaks, CA (US)

(72) Inventors: Dennis Strauss, Ventura, CA (US); Vivek Mehrotra, Simi Valley, CA (US)

(73) Assignee: Teledyne Scientific and Imaging, LLC, Thousand Oaks, CA (US)

( * ) Notice: Subject to any disclaimer, the term of this patent is extended or adjusted under 35 U.S.C. 154(b) by 0 days.

(21) Appl. No.: 13/933,335

(22) Filed: Jul. 2, 2013

(65) Prior Publication Data
US 2013/0284086 A1 Oct. 31, 2013

Related U.S. Application Data

(62) Division of application No. 12/894,043, filed on Sep. 29, 2010, now Pat. No. 8,491,970.

(51) Int. Cl.
| | |
|---|---|
| *B05C 9/02* | (2006.01) |
| *C01B 31/02* | (2006.01) |
| *B82B 3/00* | (2006.01) |
| *B82Y 30/00* | (2011.01) |
| *B82Y 40/00* | (2011.01) |

(52) U.S. Cl.
CPC ............... *C01B 31/0226* (2013.01); *B05C 9/02* (2013.01); *B82B 3/0014* (2013.01); *B82B 3/0066* (2013.01); *B82Y 30/00* (2013.01); *B82Y 40/00* (2013.01); *C01B 31/0266* (2013.01); *C01B 31/0273* (2013.01); *C01B 2202/36* (2013.01); *Y10T 428/24132* (2015.01); *Y10T 428/24802* (2015.01)

(58) Field of Classification Search
None
See application file for complete search history.

(56) References Cited

U.S. PATENT DOCUMENTS

| | | | | |
|---|---|---|---|---|
| 6,597,090 | B1 * | 7/2003 | Mancevski | 313/309 |
| 2005/0264155 | A1 * | 12/2005 | Liu et al. | 313/309 |
| 2008/0286521 | A1 * | 11/2008 | Eberlein et al. | 428/114 |
| 2010/0175243 | A1 * | 7/2010 | Liu et al. | 29/594 |
| 2012/0056149 | A1 * | 3/2012 | Cleavelin et al. | 257/9 |

* cited by examiner

*Primary Examiner* — Dah-Wei D Yuan
*Assistant Examiner* — Jethro M Pence
(74) *Attorney, Agent, or Firm* — Dietze and Davis, P.C.; Glenn H. Lenzen

(57) ABSTRACT

A method and device for producing an aligned carbon nanotube array. The arrays of aligned carbon nanotubes (CNTs) may be formed by drying liquid dispersions of CNTs on a nanoporous substrate under an applied electrostatic field. The array may be used in a number of applications including electronics, optics, and filtration, including desalination.

23 Claims, 4 Drawing Sheets

DEVICE FOR FORMING VERTICALLY ALIGNED CARBON NANOTUBE ARRAYS

CROSS REFERENCE TO RELATED APPLICATION

This is a divisional application claiming the benefit of U.S. patent application Ser. No. 12/894,043 filed Sep. 29, 2010, which is incorporated herein by reference in its entirety as if fully set forth herein.

U.S. GOVERNMENT RIGHTS

The invention described herein was made under United States Government Contract Number 71328. The government may have certain rights in this invention.

FIELD

This invention relates to a method and device used to produce vertically aligned carbon nanotube arrays. In particular, the present invention relates to a method, array, and device used to produce vertically aligned carbon nanotube arrays from liquid dispersions.

BACKGROUND

Carbon nanotubes and nanowires are noted for their useful and novel properties in electrical, chemical, optical, and filtration applications, among others. Often, such nanotubes are grown in bulk and have non-uniform diameters. Accordingly, it would be desirable to provide methods for positioning and orienting nanotubes into arrays on a variety of substrates or within a variety of integrated devices. Existing efforts to align nanotubes for such applications are often difficult and labor intensive. Therefore, in situ efforts to align nanotubes during the growth process have been attempted.

In one such example, a porous substrate or filter is used to align the nanotubes as they are grown. In this example, the diameter of aligned carbon nanotubes and the density of the array are limited. Typically, very high temperatures are necessary to grow the carbon nanotubes. Accordingly, any substrates or other apparatus used to make a carbon nanotube array must be specially constructed to survive such high temperatures. Other issues arise with the difficulties of purifying and/or isolating nanotubes grown in an array based on certain characteristics, such as length or diameter.

Thus, a need exists for a method and apparatus for forming aligned, vertically or otherwise, carbon nanotubes at room temperatures on a variety of substrates where the carbon nanotubes can be purified and selected based on desired characteristics, such as length and/or diameter.

SUMMARY

The present disclosure provides methods for producing an aligned carbon nanotube array and an aligned carbon nanotube array useful in a number of applications. In one embodiment, a method for forming an aligned carbon nanotube array includes applying an electrostatic voltage across a solution containing carbon nanotubes. The carbon nanotubes are then attached to a porous substrate.

In another embodiment, a method for forming an aligned carbon nanotube array includes passing a solvent containing at least one suspended carbon nanotube through a porous substrate. An electrostatic voltage is applied across the porous substrate and the solvent is evaporated as the electrostatic voltage is applied. A binder is then applied to the porous substrate to bind the at least one carbon nanotube to the porous substrate.

One embodiment of the method for forming a vertically aligned carbon nanotube array includes depositing carbon nanotubes suspended in a solvent onto the surface of a nanoporous substrate. An electrostatic voltage is applied perpendicular to the surface of the nanoporous substrate to align the carbon nanotubes perpendicular to the surface. The solvent is evaporated as the electrostatic voltage is applied. Then a binding solution is applied to the nanoporous substrate. The binding solution binds the perpendicularly aligned carbon nanotubes to the nanoporous substrate.

In yet another embodiment, the method for forming vertically aligned carbon nanotube arrays uses carbon nanotubes of a particular diameter. The method includes suspending grown carbon nanotubes in a liquid and then oxidizing the carbon nanotubes in the suspension using ultrasonication. The suspension is spun in a centrifuge to isolate the carbon nanotubes. A fraction of the suspension containing the carbon nanotubes is collected and at least one surfactant is added to the fraction. The surfactant bonds to the carbon nanotubes having the particular diameter, and the fraction is then spun to isolate the carbon nanotubes having the particular diameter. Another fraction of the suspension containing the at least one surfactant and the carbon nanotubes having the particular diameter is collected. The other fraction is then deposited onto a nanoporous substrate. Next, an electrostatic voltage is applied perpendicular to the surface of the nanoporous substrate. The electrostatic voltage aligns the carbon nanotubes perpendicular to the surface of the nanoporous substrate. The liquid is evaporated from the nanoporous substrate as the electrostatic voltage is applied. Finally, a hydrocarbon-based binding solution is applied to the nanoporous substrate to bind the perpendicularly aligned carbon nanotubes to the nanoporous substrate.

In one embodiment, an aligned carbon nanotube array is provided. The aligned array of carbon nanotubes includes purified carbon nanotubes with approximately uniform diameters, a nanoporous substrate, and a binding agent. In this embodiment, the carbon nanotubes are electrostatically-aligned perpendicular to a surface of the nanoporous substrate.

In another embodiment, a device for forming vertically aligned carbon nanotube arrays is provided. The device includes a first electrode connected to a high voltage source and a second electrode connected to ground. The device also includes a substrate, onto which an application of a liquid suspension containing carbon nanotubes is applied. The substrate is located between the first and second electrodes and is in communication with the first electrode. The device also includes a binding solution.

DETAILED DESCRIPTION

The methods of the present invention provide processes to align carbon nanotubes (CNTs) from liquid dispersions. In one example, the method vertically aligns carbon nanotubes post-growth. The carbon nanotubes may be grown or produced by any method.

The disclosed methods effectively separate the carbon nanotube growth process from the alignment process. Post-growth, particular nanotubes may be purified and selected for vertical alignment based on one or more parameters. Further, the methods use an electrostatic field to align carbon nanotubes suspended in a solution, while the solution is removed. The CNTs can be single-walled nanotubes (SWNTs) or multi-walled nanotubes (MWNTs). Additionally, the CNTs may be any length; however, the length may be predetermined based upon the intended use of the aligned array. In one embodiment, the lengths range from approximately 15 nm to 1 μm. However, preferably, the CNTs range in length from approximately 50 nm to approximately 1 μm.

The CNTs may have any diameter; however, a particular diameter may be selected based upon the intended use of the aligned array. In one embodiment, the array contains CNTs ranging in diameter from approximately 0.5 nm to approximately 100 nm. In another embodiment, the CNTs are uniform in diameter. Preferably, the CNTs have an outer diameter of at least 0.7 nm.

Figure 1:
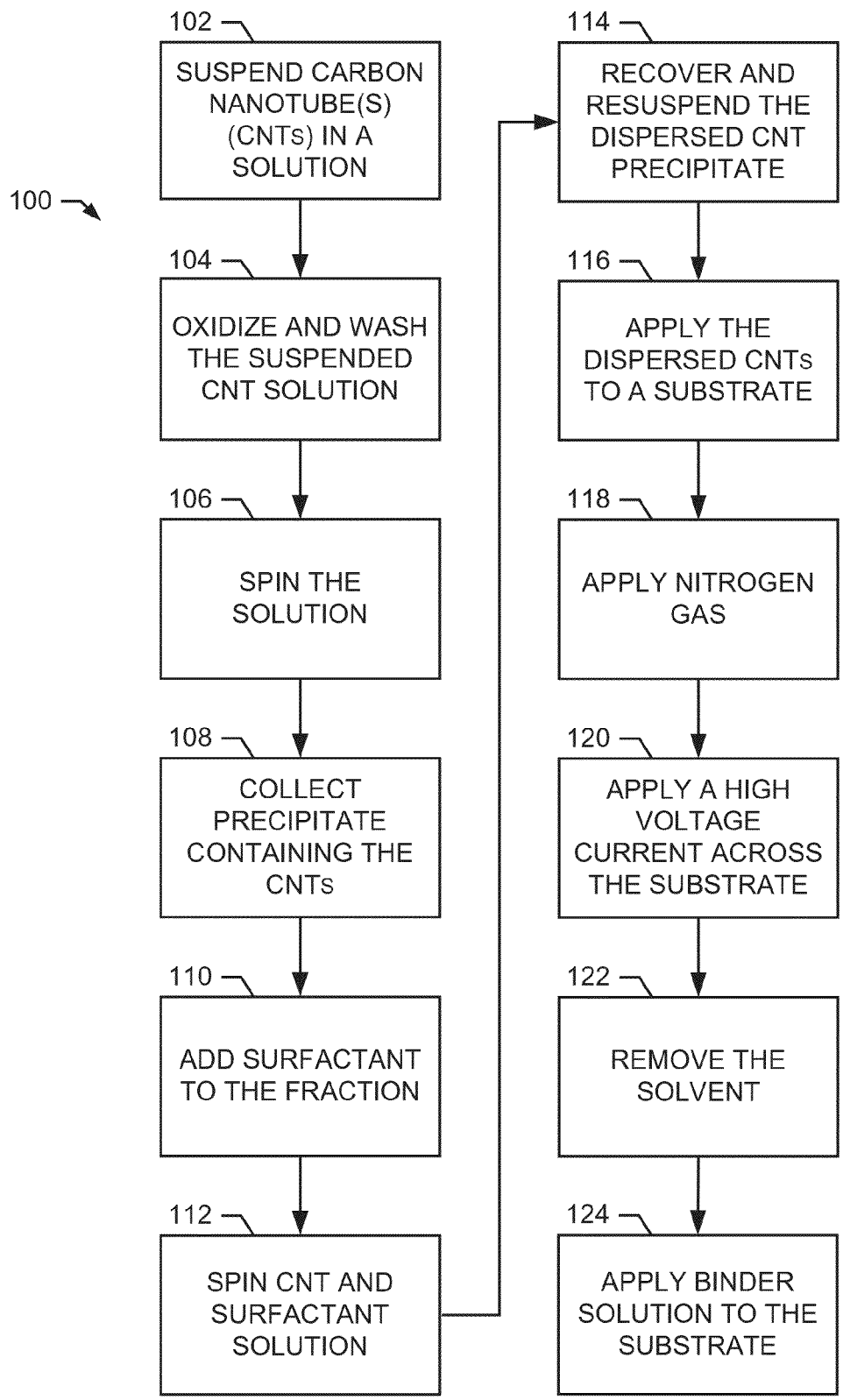
FIG. 1 is a flow chart of a carbon nanotube aligning process in accordance with an embodiment of the present invention.

FIG. 1 is a flow diagram of a carbon nanotube aligning process 100. At step 102, the nanotubes are suspended in a liquid. By way of example and not limitation, the CNTs may also be suspended in water, an alcohol, dimethylformamide (DMF), dimethyl sulfoxide (DMSO), aqueous polyfunctional amine solutions (e.g. m-phenylenediamine), a latex polymer, or a liquid containing one or more monomers. In a preferred embodiment, the CNTs are suspended in a solvent containing a polyfunctional amine.

The CNTs are suspended in the liquid at a concentration ranging from approximately 0.1 mg/ml to approximately 1.0 mg/ml. Preferably, the suspension has a CNT concentration from approximately 0.1 m/ml to approximately 0.3 mg/ml. In one embodiment, the CNTs in the suspension have the same length. In another embodiment, the CNTs in suspension may be any length.

In the suspension, the CNTs adhere to one another due, in part, to van der Waals forces, residue from one or more catalysts, and other byproducts from the CNT production process. Thus, at step 104, the nanotube suspension is oxidized and/or dispersed to break up any nanotube bundles that may have formed. In one embodiment, the suspension is dispersed using ultrasonic energy. The CNT suspension is subjected to ultrasonication for up to 24 hours.

In another embodiment, an oxidant, such as ammonium persulfate, is added to the suspension to aid in breaking up the nanotube bundles. For example, ammonium persulfate is added at a concentration of approximately 10 to 100 mg/ml of liquid. The CNT suspension including the added oxidant is then subjected to ultrasonication for up to 24 hours.

At step 106, the oxidized suspension is washed and centrifuged to collect the separated CNTs. In an embodiment, the oxidized suspension is washed with deionized (DI) water a number of times and spun in a centrifuge.

At step 108, the supernatant liquid is removed, and the precipitate containing the CNTs is collected. By way of example and not limitation, the supernatant liquid may be removed by evaporation, decantation, or withdrawn with a pipette. At step 110, one or more surfactants diluted in water are added to the precipitate fraction in order to resuspend the CNTs. The surfactant or combinations of multiple surfactants tend to suspend different CNTs based upon the diameter of the nanotube. Therefore, the surfactant(s) are specifically chosen to provide a suspension of CNTs having a preferred diameter. In various embodiments, the one or more surfactants may be diluted by other liquids. In other embodiments, undiluted solvents may also be added to the precipitate fraction.

By way of example and not limitation, a mixture of water and anionic surfactants, such as sodium dodecylsulfate (SDS) and sodium cholate (SC), is used to disperse CNTs of a particular diameter. In other examples, the surfactant may be sodium dodecylbenzenesulfonate, sodium deoxycholate, a cationic surfactant, a nonionic surfactant, or combinations thereof. The CNT and surfactant mixture is centrifuged to separate the non-dispersed CNTs from the dispersed CNTs having the particular diameter, at step 112.

At step 114, the diameter-selected CNTs are collected and resuspended in a liquid that transitions to a gaseous phase at temperatures and pressures that do not adversely alter the stability of nanotubes. For example, the CNTs are suspended in a liquid that evaporates at temperatures and pressures lower than the melting point and/or sublimation point of the CNTs, such as water, ethanol, dimethyl sulfoxide (DMSO), dimethyl formamide (DMF), or combinations thereof. In one embodiment, the diameter-selected CNTs are suspended in an aqueous polyfunctional amine solution (m-phenylenediamine). In a preferred embodiment, the diameter-selected CNTs are suspended in water.

The solution enriched with the diameter-selected CNTs is then deposited onto a nanoporous substrate mounted onto a flat plate electrode, at step 116. Depositing the solution onto the nanoporous substrate may include coating, spraying, or any other method of applying the solution to the nanoporous substrate. The flat plate electrode is connected to a voltage source, such as a high voltage generator and positioned opposite a similarly-shaped grounded electrode. At step 118, a non-reactive gas, such as nitrogen ($N_2$), is passed over the substrate. In one embodiment, the non-reactive gas is applied directly to the substrate using an air knife. In another embodiment, the non-reactive gas is used to purge an environment around the substrate and electrode. In this embodiment, the substrate and electrode may be placed within a closed environment or suitable housing.

At step 120, a high voltage electrostatic field is generated between the two electrodes. The CNTs are aligned in the same direction as the applied electrostatic field; therefore, the CNTs are aligned perpendicular to the nanoporous substrate.

The solvent is then removed at step 122. In one embodiment, the solvent is removed by evaporation. For example, the nitrogen gas introduced at step 118 aids the evaporation of the solvent suspending the diameter-selected CNTs. As the solvent evaporates, the solution on the substrate becomes more viscous thereby holding the CNTs perpendicular to the substrate. In another embodiment, the solvent is drawn away from the CNTs and through the nanoporous substrate by capillary action. In yet another embodiment, the solvent is removed by a vacuum applied to the opposite surface of the substrate. In a number of embodiments, the solvent is removed as the electrostatic field is applied.

Next, a binder solution is applied to the substrate, at step 124. The binder solution initiates an interfacial polymerization reaction with a polyamine of the CNT solution. This reaction forms a polyamide polymer membrane in situ. The polymer membrane permanently locks the CNTs in the perpendicular orientation.

The aligned CNT array may be used in a number of applications. For example, the array may used as a filter where molecules having diameters smaller than the diameter of the CNT pores will pass down the length of the CNTs, while molecules and ions with larger diameters will be excluded from passing through the CNTs.

In one embodiment, the polymer membrane is thinner than the mean length of the CNTs. In another embodiment, the thickness of the polymer membrane is equal to the mean length of the CNTs. In yet another embodiment, where the CNTs are of uniform length, the thickness of the polymer membrane is equal to the length of the CNTs.

The substrate and CNT array may be used in a number of applications. By way of example and not limitation, the array may be incorporated into electronics, sensors, reverse osmosis filtration systems, gas purification systems, and other filter systems.

Figure 2:
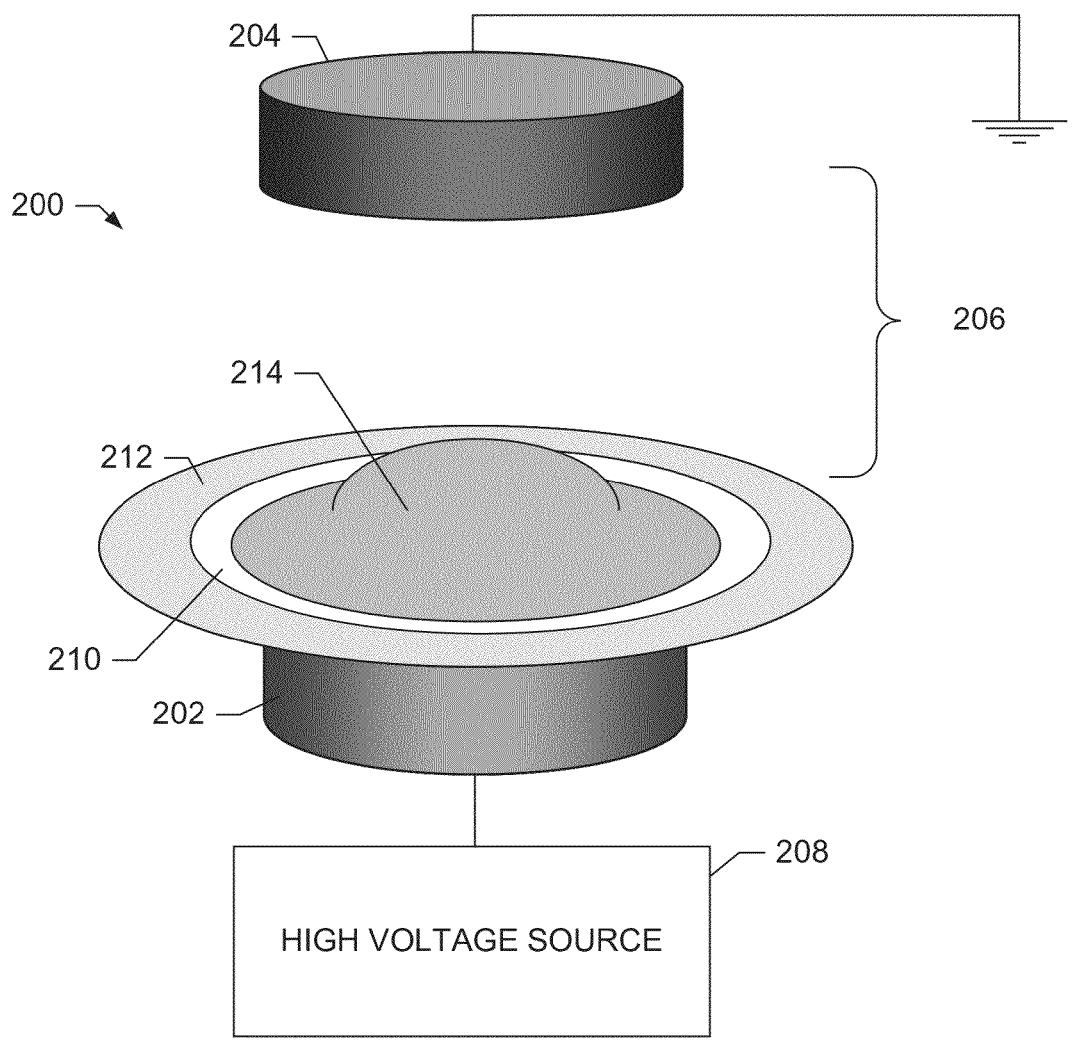
FIG. 2 is a drawing of an exemplary electrostatic alignment device.

FIG. 2 is a drawing of an exemplary electrostatic alignment device that may be used to align CNTs in liquid dispersions. The electrostatic alignment device 200 includes electrodes 202 and 204 separated by a gap 206. One electrode 202 is connected to a high voltage source 208, while the other electrode 204 is grounded.

In one embodiment, the electrodes 202 and 204 are substantially flat. Furthermore, the electrodes 202 and 204 have rounded corners and beveled edges, to prevent arcing between the electrodes. The electrodes 202 and 204 are not limited in size and may have any surface area suitable to sustain an electrostatic field that is substantially perpendicular to the surface of the electrodes. In one embodiment, the electrodes are circular and approximately one-inch in diameter. In another embodiment, the electrodes 202 and 204 are rectangular in shape and approximately 14"×16" in dimension.

The electrodes 202 and 204 may be composed of any conductive material. In one embodiment, the electrodes 202 and 204 are composed of a conductive metal, such as steel or aluminum. In another embodiment, the electrodes 202 and 204 are composed of nonconductive material that has been coated with a conductive material, such as indium tin oxide (ITO) coated glass. Preferably, the electrodes 202 and 204 are composed of a non-corrosive metal, such as stainless steel. In various embodiments, the electrodes 202 and 204 may be covered with polytetrafluoroethylene (PTFE) tape, such as Teflon tape. The tape provides additional protection to prevent arching between electrodes.

In one embodiment, the electrode 202 is a flat plate electrode that has a surface area large enough to support a nanoporous substrate 210. The surface area of the electrode 202 is sufficiently larger than the surface area of the substrate 210. Therefore, the substrate 210 can be placed near the center the electrode 202 where the electrostatic field is more uniform, and not subjected to distortions in the electrostatic field near the edge of the electrode 202.

The nanoporous substrate 210 is a membrane having the features of a nanoscale filter. Preferably, the pores define a tortuous path through the membrane, thereby impeding the passage of carbon nanotubes through the membrane. The pore diameters range from approximately 0.5 nm to 100 nm. In one embodiment, the pore diameter of the substrate 210 is less than or equal to the diameter of CNTs being aligned.

In various embodiments of the electrostatic alignment device 200, an absorbent blotter 212, is positioned between the electrode 202 and the substrate 210. The blotter 212, which may be composed of absorbent cellulose, protects the electrode 202 and aids in the removal of liquid from a CNT-containing solution 214 applied to the substrate 210.

The gap 206 between the electrodes ranges between 1 and 60 mm. In one embodiment, the gap 206 is approximately 40 mm. In another embodiment, the gap 206 is variable and based upon the voltage applied across the electrodes 202 and 204. In this embodiment, the gap 206 is increased at a ratio of approximately 1 mm per 1000-5000 volts; therefore, a gap of 20 mm is used, when 20,000 to 100,000 volts are applied across the electrodes 202 and 204.

The high voltage source 208 may be any voltage source capable of generating an electric potential. Preferably, the high voltage source 208 is a generator capable of generating an electric potential difference between the electrodes of approximately 30 kV and 70 kV.

Figure 3:
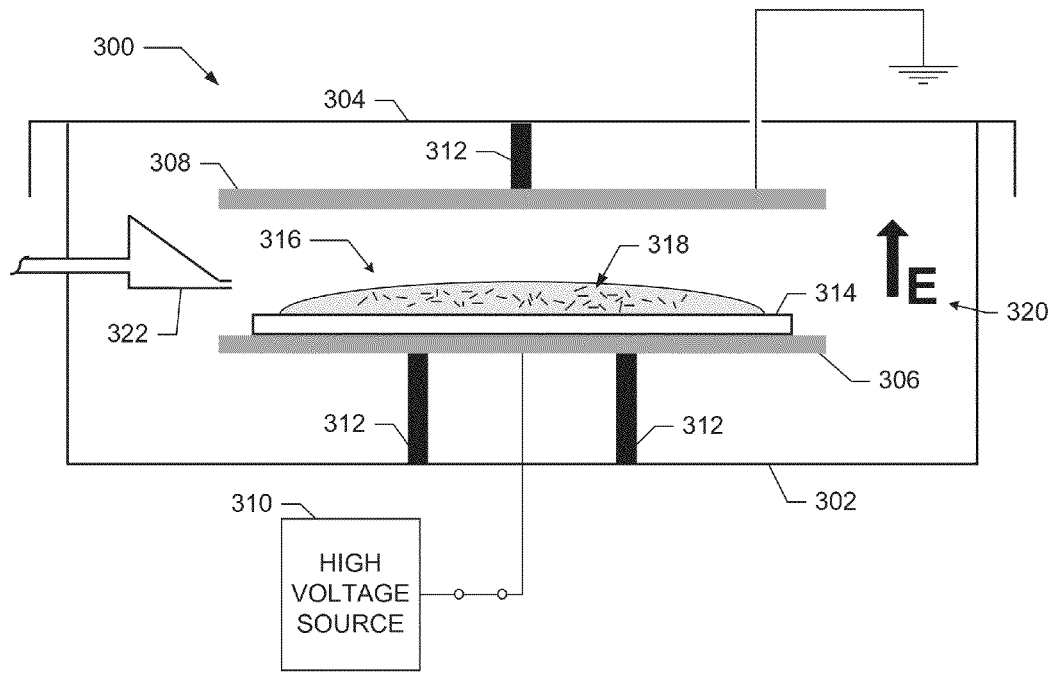
FIG. 3 is a drawing of an exemplary electrostatic alignment device.

FIG. 3 is a drawing of an exemplary electrostatic alignment device that may be used to align CNTs in liquid dispersions. The electrostatic alignment device 300 includes housing 302 and a removable lid 304. In one embodiment, the housing 302 and removable lid 304 are composed of a non-conductive or insulating material in order to prevent arching from the exterior of the device 300. For example, the housing may be composed of plastic, ceramic, or glass. The housing 302 and removable lid 304 include one or more openings (not shown) through which electrical connections can be made to electrodes 306 and 308 located within the housing 302.

The electrodes 306 and 308 are similar to electrodes 202 and 204 (see FIG. 2). The electrode 306 is connected to a high voltage source 310 and the ground electrode 308 is connected to ground. The electrodes 306 and 308 are separated from the housing 302 and the lid 304 by one or more standoffs 312. The standoffs 312 are composed of an insulating material. In one embodiment, the standoffs 312 are affixed to the housing 302 and lid 304. In another embodiment, the standoffs are removable. The number of standoffs 312 is variable, depending upon the size and orientation of the housing 302, the lid 304, or the electrodes 306 and 308.

With the lid 304 removed, a substrate 314 is placed on the charged electrode 306. In one embodiment, a blotter (not shown) is placed between the substrate 314 and the electrode 306. A solution 316 containing suspended CNTs 318 is then applied to the substrate 314. As a voltage is applied to the electrode 306, an electrostatic field 320 is generated between the electrodes 306 and 308. The electrostatic field 320 flows from the electrode 306 to the ground electrode 308.

In another embodiment, the interior of the housing 302 is purged with a non-reactive gas, such as nitrogen gas, from a gas source. By way of example and not limitation, a gas source may include a tank or cylinder of compressed gas. The non-reactive gas prevents arcing between the electrodes 306 and 308. The non-reactive gas also expedites the evaporation of the solvent from the solution 316. In yet another embodiment, the solvent is evaporated, by applying the non-reactive gas directly to the surface of the substrate 314. For example, nitrogen gas may be directly applied using an air knife 322.

In an embodiment, the nitrogen gas is applied continuously as the voltage is applied to the electrode 306. In another embodiment, the nitrogen gas is applied to the substrate in intervals.

Figure 4:
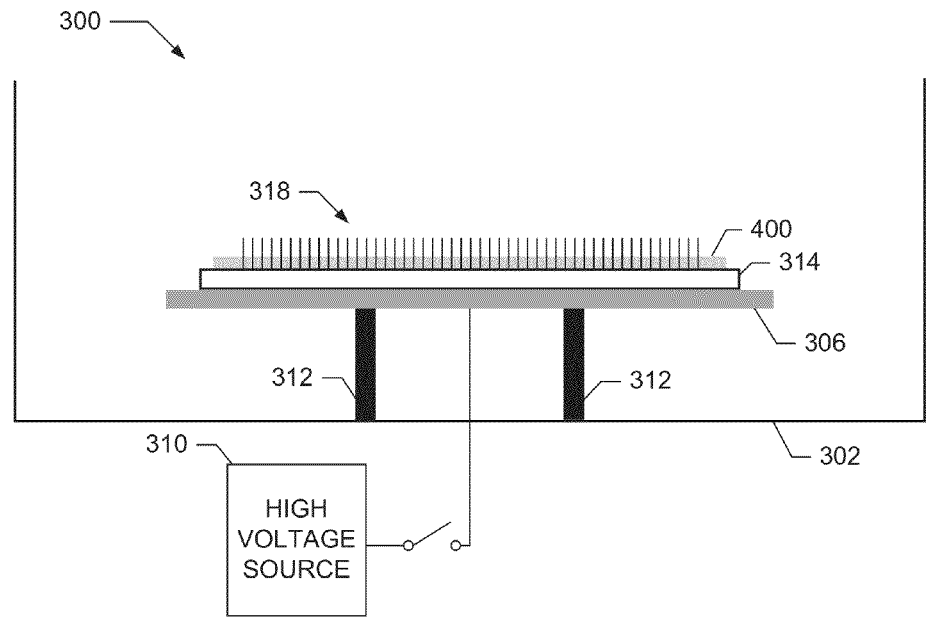
FIG. 4 is a drawing depicting a vertically aligned carbon nanotube array produced by an exemplary electrostatic alignment device.

FIG. 4 is a drawing of an exemplary electrostatic alignment device after the high voltage source 310 is disconnected from the electrode 306. The CNTs 318 have aligned themselves perpendicular to the surface of the substrate 314. A binder solution is applied to the substrate. The binding solution undergoes an interfacial polymerization reaction at the boundary between the binder solution and the remaining solvent. This reaction produces a polymer membrane 400 that holds the carbon nanotube in the perpendicular orientation.

Figure 5:
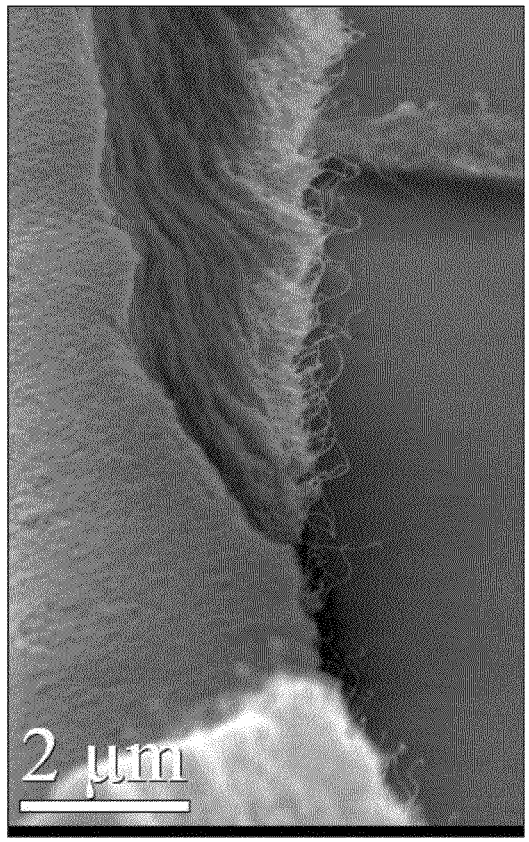
FIG. 5 is a photograph depicting a cross-section of a vertically aligned single-walled nanotube deposit.
Figure 6:
FIG. 6 is a photograph depicting a cross-section of a vertically aligned single-walled nanotube deposit.

FIGS. 5-6 are photographs of a cross-sectional view of an embodiment of an aligned CNT array. The photographs depict a structure having a high density array of CNTs. The aligned CNT array produced by one or more embodiments of the methods disclosed herein, include purified carbon nanotubes electrostatically aligned perpendicular to a surface of the nanoporous substrate. The purified carbon nanotubes are secured in place by a binding agent. As shown, in various embodiments the CNTs are densely packed. For example, the CNTs are aligned in the nanoporous substrate at a concentration of at least $1 \times 10^{11}$ cm$^{-2}$.

An Exemplary Method of Producing a Vertically Aligned Carbon Nanotube Array

In an exemplary method for producing a vertically aligned CNT array, a nanoporous membrane, such as a Sepro PS35 polysulfone nanoporous ultra-filtration membrane is used a substrate to support the array. The Sepro PS35 membrane, which is normally hydrophobic, is treated with Polyethylene Glycol (PEG) to make it hydrophilic. The membrane is the mounted onto a cellulose blotter and placed onto a flat-plate electrode within a plastic housing.

Next, a suspension of CNTs in an aqueous polyfunctional amine solution (m-phenylenediamine) is deposited onto the surface of the nanoporous membrane on the electrode. A plastic lid is placed over the housing. Mounted on the inside of the lid is a matching ground electrode. The lid is placed on top of the box, and a ground wire is attached to the ground electrode. The ground electrode is mounted such that it is approximately 40 mm from the flat-plate electrode supporting the nanoporous membrane.

Next, dry nitrogen from an air knife is blown over the surface of the nanoporous membrane that includes the deposited CNT solution. As the nitrogen gas is applied, approximately 40 kV is applied to the flat-plate electrode supporting the nanoporous membrane substrate. The voltage creates an electrostatic field that flows from the flat-plate electrode to the grounding electrode. The flow of nitrogen gas evaporates the water from the CNT dispersion, while the electrostatic field aligns the CNTs perpendicular to the nanoporous membrane.

As the solvent evaporates from the CNT suspension, the solute becomes more viscous. The CNTs are then held in the vertical orientation, even after the electric field is turned off. Next, a solution of trimesoyl chloride in heptane is applied to the surface. The trimesoyl chloride and m-phenylenediamine react to form an insoluble polyamide membrane containing the CNTs. Due to the limited solubility of the reactants in the trimesoyl chloride solution and m-phenylenediamine, the thickness of the polyamide membrane is self-limited. Further, defects in the polyamide membrane self-repair as the reaction continues. As the reaction progresses, the CNTs become permanently trapped in the polyamide membrane.

While the invention has been explained in relation to exemplary embodiments, it is to be understood that various modifications thereof will become apparent to those skilled in the art upon reading the description. Therefore, it is to be understood that the invention disclosed herein is intended to cover such modifications as fall within the scope of the appended claims.

What is claimed is:

1. A device for forming vertically aligned carbon nanotube arrays of pre-grown single or multi-walled carbon nanotubes having preselected lengths and diameters, the device comprising:

a first electrode;
a second electrode connected to ground; the first and second electrodes forming gap there between;
a porous substrate located intermediate the first and second electrodes and in communication with the first electrode;
an absorbent blotter positioned intermediate the first electrode and the porous substrate, the blotter being structured and arranged to protect the first electrode;
a device configured to suspend the carbon nanotubes in a solution;
a device configured to deposit on the porous substrate the solution having a plurality of carbon nanotubes suspended therein;
a voltage source operatively connected to the first and second electrodes and adapted to apply a voltage there across to generate an electrostatic electrostatic field between the first and second electrodes in a direction perpendicular to the porous substrate, thereby perpendicularly aligning the plurality of carbon nanotubes to the porous substrate; and
a device configured to apply a binding solution to the porous substrate to bind the perpendicularly aligned carbon nanotubes thereto.

2. The device of claim 1 wherein the gap between the first and second electrodes is based upon the voltage applied across the first and second electrodes.

3. The device of claim 2 wherein the gap is increased at a ratio of approximately 1 mm per 1,000 to 5,000 volts.

4. The device of claim 2 wherein the gap between the first and second electrodes is in a range of approximately 1 mm to approximately 60 mm.

5. The device of claim 1 wherein the solution in which the carbon nanotubes are suspended is selected from the group consisting of water, an alcohol, an aqueous polyfunctional amine, a latex polymer, dimethylformamide, dimethyl sulfoxide and a liquid containing one or more monomers.

6. The device of claim 5 wherein the carbon nanotubes are suspended in a liquid in a concentration of approximately 0.1 mg/ml to approximately 1.0 mg/ml.

7. The device of claim 1 further including a device configured to separate any bundles of carbon nanotubes that may have formed in the solution.

8. The device of claim 7 wherein the device configured to separate the bundles of carbon nanotubes comprises an oxidant added to the solution.

9. The device of claim 7 wherein the device configured to separate the bundles of carbon nanotubes comprises an ultrasonic energy source.

10. The device of claim 8 wherein the device configured to separate bundles of carbon nanotubes further comprises a centrifuge adapted to separate the carbon nanotubes from the oxidized solution.

11. The device of claim 10 further including a device configured to remove the oxidized solution.

12. The device of claim 11 further including a device configured to add one or more surfactants diluted in water to re-suspend the carbon nanotubes in a second solution.

13. The device of claim 12 wherein the one or more surfactants are structured and arranged to selectively suspend the carbon nanotubes as a function of the nanotube diameter.

14. The device of claim 13 further including an apparatus configured to separate the selectively suspended carbon nanotubes from the second solution.

15. The device of claim 14 further including a device configured to add a third solution to the separated diameter-selected nanotubes for deposition on the porous substrate.

16. The device of claim 15 wherein the third solution possesses physical properties that permit it to transition from a liquid phase to a gaseous phase at temperatures which do not adversely alter the stability of the carbon nanotubes.

17. The device of claim 1 further including a device configured to introduce a non-reactive gas to the porous substrate.

18. The device of claim 17 wherein the device configured to introduce a non-reactive gas comprises an air knife.

19. The device of claim 1 further including a housing and a removable lid structured and arranged to contain the electrodes and the porous substrate.

20. The device of claim 19 further including one or more insulating structures adapted to separate the first and second electrodes from the housing and the lid.

21. The device of claim 1 wherein the porous substrate is in the form of a nanoscale filter.

22. The device of claim 21 wherein the porous substrate includes a plurality of pores having preselected diameters, the pores defining a tortuous path therethrough.

23. The device of claim 17 wherein the preselected diameters are in the range of approximately 0.5 nm to approximately 100 nm.

\* \* \* \* \*

UNITED STATES PATENT AND TRADEMARK OFFICE
CERTIFICATE OF CORRECTION

PATENT NO. : 9,108,849 B2  Page 1 of 1
APPLICATION NO. : 13/933335
DATED : August 18, 2015
INVENTOR(S) : Strauss et al.

It is certified that error appears in the above-identified patent and that said Letters Patent is hereby corrected as shown below:

On the Title Page:

Item: (71) Applicant: (Should read as)

Teledyne Scientific & Imaging, LLC.

Item: (73) Assignee: (Should read as)

Teledyne Scientific & Imaging, LLC.

Signed and Sealed this
Ninth Day of August, 2016

Michelle K. Lee
*Director of the United States Patent and Trademark Office*